United States Patent [19]

Sacarisen

[11] 3,840,305
[45] Oct. 8, 1974

[54] ELECTRO-OPTICAL APPARATUS WITH TEMPERATURE COMPENSATION

[75] Inventor: David Frederick Sacarisen, Saugus, Calif.

[73] Assignee: International Telephone and Telegraph Corporation, New York, N.Y.

[22] Filed: July 20, 1973

[21] Appl. No.: 381,248

[52] U.S. Cl.............. 356/226, 250/564, 356/72, 356/201
[51] Int. Cl............... G01j 1/44, G01n 21/00
[58] Field of Search........ 250/564, 573; 356/72, 43, 356/128, 173, 201, 207, 218, 222, 226, 256

[56] References Cited
UNITED STATES PATENTS

| | | | |
|---|---|---|---|
| 2,649,012 | 8/1953 | Schnelle | 356/134 |
| 3,062,092 | 11/1962 | Schmidt | 356/226 |
| 3,727,066 | 4/1973 | Louderbach | 356/201 |

Primary Examiner—Ronald L. Wibert
Assistant Examiner—Conrad Clark
Attorney, Agent, or Firm—A. Donald Stolzy

[57] ABSTRACT

A photometric analyzer for stack gases such as $SO_2$ and/or $NO_2$ wherein a gas temperature sensor is connected in the negative feedback path of a differential amplifier. The amplifier circuit removes temperature error from the analyzer output. A nickel resistor, when employed for the sensor, has been found to possess exceptionally good utility in helping to provide good temperature compensation. Switchover to a constant resistance feedback path gives a better curve fit below a temperature of, for example, about 345° K.

28 Claims, 3 Drawing Figures

PATENTED OCT 8 1974　　　　　　　　　　　　3,840,305
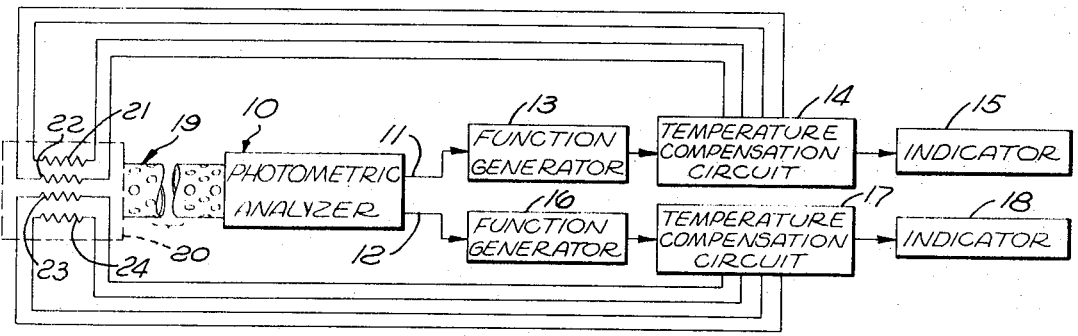
FIG.1.
FIG.2.
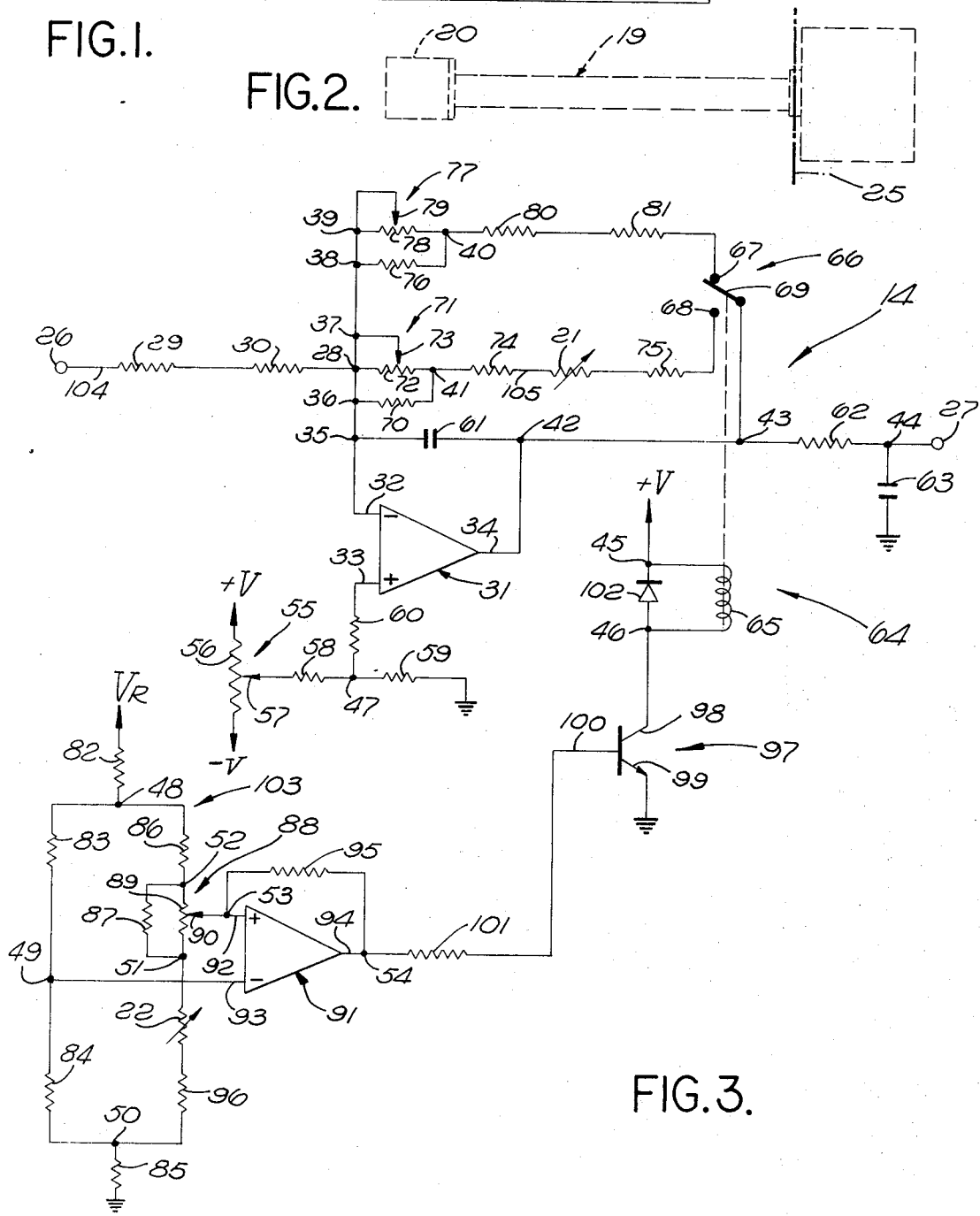
FIG.3.

ELECTRO-OPTICAL APPARATUS WITH TEMPERATURE COMPENSATION

BACKGROUND OF THE INVENTION

This invention relates to electro-optical systems, and to temperature compensation means for a photometer.

In the past, temperature compensation means have not been provided for photometers.

SUMMARY OF THE INVENTION

In accordance with the device of the present invention, the above-described and other disadvantages of the prior art are overcome by connecting variable gain means from a photometer that provides an output $S_o$ where $$S_O = e_o e_t,$$

$e_o$ being directly proportional to a parameter of a material being monitored, and $e_t$ being a dimensionless function of temperature $t$ in degrees Kelvin. The variable gain means has $S_o$ as its input. The variable gain means produces an output which is directly proportional to the product of $S_o$ and the reciprocal of $e_t$. Temperature compensation is thereby achieved.

One additional feature of the present invention resides in the use of a nickel resistor as a temperature sensor for accurate temperature compensation.

Still another feature of the invention resides in holding the output of the variable gain means directly proportional to $S_o$ when the monitored material temperature is below a predetermined temperature such as, for example, below 345°.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a block diagram of one embodiment of the present invention;

FIG. 2 is a diagrammatic view of a probe of a photometric analyzer; and

FIG. 3 is a schematic diagram of a temperature compensation circuit shown in FIG. 1.

DESCRIPTION OF THE PREFERRED EMBODIMENT

In FIG. 1, a photometric analyzer is illustrated at 10 having output leads 11 and 12. A function generator 13, a temperature compensation circuit 14 and an indicator 15 are connected in succession in that order from analyzer output lead 11. A function generator 16, a temperature compensation circuit 17 and an indicator 18 are connected in succession in that order from the analyzer output lead 12.

Photometric analyzer 10 has a probe 19. A housing 20 is mounted on the end of probe 19. Housing 20 carries temperature sensitive resistors 21, 22, 23 and 24. Both ends of resistors 21 and 22 are connected to temperature compensation circuit 14. Both ends of resistors 23 and 24 are connected to temperature compensation circuit 17.

Photometric analyzer 10 without housing 20 and without resistors 21, 22, 23 and 24 may be identical to all the structure shown in copending application Ser. No. 254,098 filed May 17, 1972, by A. Vincent, L. Wysocki and H. Abrams for PHOTOMETRIC ANALYZER now U.S. Pat. No. 3,796,887; provided, however, the indicators in said copending application have been omitted. Indicators 15 and 18 have been added in lieu thereof.

By this reference hereto, said copending application is hereby incorporated herein as though fully set forth hereat.

As shown in FIG. 2, probe 19 may extend through the wall 25 of a stack. To the right of the line 25 is outside the stack. To the left of the line 25 is inside the stack.

In FIG. 1, function generator 13 may be a conventional biased diode function generator to eliminate output nonlinearities which are not a function of temperature.

Function generator 16 may be identical to function generator 13, if desired. Alternatively, the circuit elements in function generator 16 may be slightly different or entirely different from those in function generator 13.

Temperature compensation circuit 14 eliminates errors due to temperature. The same is true of temperature compensation circuit 17. Temperature compensation circuit 17 may be the same as or different from temperature compensation circuit 14. Temperature compensation circuit 17 may be identical to temperature compensation circuit 14, or temperature compensation circuit 17 may be identical to temperature compensation circuit 14 with different circuit values.

Indicator 15 may be a D.C. voltmeter calibrated in volume per unit volume, if desired. Indicator 18 may be identical to indicator 15.

From the foregoing, it will be appreciated that it is a function of the system of FIG. 1 to indicate through indicators 15 and 18 the amounts of two respective gases in a flue. For example, indicator 15 may indicate $SO_2$. Indicator 18 may indicate $NO_2$.

Temperature compensation circuit 14 is illustrated in FIG. 3 having an input terminal 26, and an output terminal 27. An input junction is provided at 28. Resistors 29 and 30 are connected in succession in that order in series from terminal 26 to input junction 28.

Circuit 14 has a differential amplifier 31 with an inverting input lead 32, a non-inverting input lead 33 and an output lead 34.

Other junctions are shown throughout the circuit at 35, 36, 37, 38, 39, 40, 41, 42, 43, 44, 45, 46, 47, 48, 49, 50, 51, 52, 53 and 54.

A potentiometer 55 is provided having a winding 56 and a wiper 57. Winding 56 has one end connected to potential $+V$, and its other end connected to potential $-V$. A resistor 58 is connected from wiper 57 to junction 47. A resistor 59 is connected from junction 47 to ground. A resistor 60 is connected from junction 47 to non-inverting input lead 33 of amplifier 31. Junctions 35, 36, 37, 38 and 39 are all connected to input junction 28. The inverting input lead 32 of amplifier 31 is connected from junction 35. A capacitor 61 is connected between junctions 35 and 42. The output lead 34 of amplifier 31 is connected to junction 42. Junction 42 is connected to junction 43. A resistor 62 is connected from junction 43 to junction 44. A capacitor 63 is connected from junction 44 to ground. Terminal 27 is connected from junction 44.

Terminal 26 is connected from function generator 13. Terminal 27 is connected to indicator 15.

A relay 64 is provided having a winding 65 connected between junctions 45 and 46. Relay 64 has a single pole, double throw switch 66 with contacts 67 and 68, and a pole 69. A resistor 70 is connected between junctions 36 and 41. A potentiometer 71 is provided having a resistive winding 72 and a wiper 73. Wiper 73 is connected from junction 37. Winding 72 is connected between junctions 28 and 41.

Resistors 74, 21 and 75 are connected in succession in that order from junction 41 to contact 68.

A resistor 76 is connected between junctions 38 and 40. A potentiometer 77 is provided with a winding 78 and a wiper 79. Wiper 79 is connected from junction 39. Resistors 80 and 81 are connected in succession in that order in series from junction 40 to contact 67.

A resistor 82 is connected from junction 48 to potential $V_R$. A resistor 83 is connected between junctions 48 and 49. A resistor 84 is connected between junctions 49 and 50. A resistor 85 is connected from junction 50 to ground. A resistor 86 is connected between junctions 48 and 52. A resistor 87 is connected between junctions 51 and 52. A potentiometer 88 is provided having a winding 89 and a wiper 90. Winding 89 is also connected between junctions 51 and 52.

Another differential amplifier 91 is provided having a non-inverting input lead 92, an inverting input lead 93 and an output lead 94.

Wiper 90 is connected to junction 53 and non-inverting input lead 92 of amplifier 91 is connected from junction 53. A resistor 95 is connected between junctions 53 and 54. Inverting input lead 93 of amplifier 91 is connected from junction 49. The output lead 94 of amplifier 91 is connected to junction 54. Resistor 22 with a resistor 96 are connected successively in that order in series from junction 51 to junction 50. A transistor 97 is provided having a collector 98, an emitter 99 and a base 100. A resistor 101 is connected from junction 54 to transistor base 100. Transistor emitter 99 is connected to ground. Transistor collector 98 is connected from junction 46. A diode 102 is connected between junctions 45 and 46 and poled to be conductive in a direction toward junction 45. Junction 45 is connected to potential +V.

OPERATION

The circuit of amplifier 31, when pole 69 engages contact 68, becomes a variable gain circuit, the gain being variable with temperature because resistor 21 is temperature sensitive. Thus, when the temperature sensitive output signal of function generator 13 is impressed upon input terminal 26, output terminal 27 produces an output signal which is no longer temperature sensitive.

It has been found that the temperature error created by photometric analyzer 10 is quite linear over a range of, for example 345° to 600°. However, below 345°, practically no temperature compensation is required. Thus, a circuit 103 acts as a bridge so that relay 64 is deenergized when the temperature of the gas falls below 345°. When relay 64 deenergizes, switch pole 69 is spring biased with contact 67. This makes the gain of the circuit of amplifier 31 constant.

Potentiometer 55 is provided to supply a constant but adjustable D.C. input voltage to non-inverting input lead 33 of amplifier 31.

Resistor 95 provides positive feedback to amplifier 91. This makes relay 64 energize quickly.

The phrase "photometric analyzer," as used herein, is hereby defined to include that disclosed in the said copending application or elsewhere without any indication or with or without any function generator.

The system of FIG. 1 is employed to give indications both for $SO_2$ and $NO_2$. If desired, provision to measure only one gas may be employed. Alternatively, one indicator may be employed with a single pole, double throw switch, if desired. The same is true of one function generator with a single pole, double throw switch. The same is also true of a temperature compensation circuit with a single pole, double throw switch.

Function generator 13 may be entirely conventional, if desired.

The phrase "temperature compensation circuit" may be defined as including everything illustrated in FIG. 3.

The output of photometric analyzer 10 on lead 11 or the output of function generator 13 may be a D.C. voltage defined as $S_o$. In this case, $S_o = e_o e_t$. If so, $e_o$ will be a signal directly proportional to a parameter of a gas, e.g. its concentration. The term $e_t$ is a dimensionless function of temperature $t$ in degrees Kelvin. The signal which appears at output terminal 27 in FIG. 3 is then directly proportional to the product of $S_o$ and the reciprocal of $e_t$.

It has been discovered that very accurately $$e_t = At + B$$

where,
A is a positive constant per degree Kelvin but otherwise dimensionless, and
B is a positive dimensionless constant.

For use herein, the phrase "photometric analyzer" may or may not include function generator 13 and/or function generator 16.

Resistor 21 in FIG. 3 may be described as a first resistor having a first resistance which is a function of temperature in degrees Kelvin. If so, this first resistance may be approximately equal to $R(t)$ where $$R(t) = R_o f(t),$$

and $R_o$ is the resistance of resistor 21 at a temperature $t = t_o$.

The sum of the resistances of the resistors 29 and 30 may be described as the equivalent series resistance of first means providing resistance connected from a variable gain means input lead to input junction 28. The first means equivalent resistance may be defined as $R_a$. Note will be taken that the circuit of amplifier 31 may be described as variable gain means having an input lead 104.

The resistance network connected from input junction 28 to a lead 105 may be described as second means connecting input junction 28 to first lead 105 of resistor 21. Resistor 75 may be described as first branch means for connecting the second lead of resistor 21 to the amplifier output lead 34. The sum of the equivalent series resistances of the first branch means and the second means, thus, can be defined as equal to $R_b$. Resistor 21, the first branch means and the first and second means are, thus, constructed in a manner such that $$f(t) = [(C/-At + B)][(R_a/R_o)] - [(R_b/R_o)]$$

where C is an arbitrary positive dimensionless constant larger than zero.

The phrase "means providing resistance," unless otherwise specified, is hereby defined to include one or more resistances whether or not temperature sensitive or not.

Preferably resistor 21 is made of nickel. The material of resistor 22 is not critical.

Resistor 22 has a positive thermal coefficient of resistance. If negative, the input leads to amplifier 91 would have to be reversed or some one or more other measures taken.

The phrases "means connecting" and "means for connecting" are hereby defined, as all the other defined terms, for use herein and in the claims, to include a switch or a conductive lead with or without one or more circuit elements, or one or more circuit elements with or without a switch or a conductive lead.

The phrase "utilization means," as used herein and in the claims, is hereby defined to include a D.C. voltmeter or other meter calibrated in percent or volume per unit volume or a process controller or otherwise.

| | |
|---|---|
| Capacitor 61 | 1 microfarad |
| Capacitor 63 | 33 microfarads |
| Potentiometer 55 | 20,000 ohms |
| Potentiometer 71 | 100 ohms |
| Potentiometer 77 | 100 ohms |
| Potentiometer 88 | 100 ohms |
| Resistor 29 | 4.5 ohms |
| Resistor 30 | 670 ohms, ± 1 percent |
| Resistor 58 | 100,000 ohms, ± 1 percent |
| Resistor 59 | 100 ohms, ± 1 percent |
| Resistor 60 | 240 ohms, ± 5 percent |
| Resistor 62 | 10,000 ohms, ± 5 percent |
| Resistor 70 | 10 ohms |
| Resistor 74 | 495 ohms |
| Resistor 75 | 5 ohms |
| Resistor 76 | 10 ohms |
| Resistor 80 | 495 ohms |
| Resistor 81 | 5 ohms |
| Resistor 82 | 220 ohms, ± 1 percent |
| Resistor 83 | 1,780 ohms, ± 1 percent |
| Resistor 84 | 1,780 ohms, ± 1 percent |
| Resistor 85 | 220 ohms, ± 1 percent |
| Resistor 86 | 178 ohms, ± 1 percent |
| Resistor 87 | 10 ohms, ± 1 percent |
| Resistor 95 | 909,000 ohms, ± 1 percent |
| Resistor 96 | 5 ohms |
| Resistor 101 | 5,100 ohms, ± 5 percent |
| Transistor 97 | 2N5135 |

For the photometric analyzer of said copending application, it has been found that the following is true:

A = 0.001231
B = 1.425

In accordance with the present invention, when nickel is used for the resistor 21, the invention operates extremely well with practically no lower temperature limit, but is preferably not employed much in excess of 600° or 700°.

For use herein and in the claims, all of the equations and conditions set forth hereinbefore and in the claims are hereby defined either to be valid for only a limited temperature range or to be valid for a large or unlimited temperature range.

The curve $f(t)$ is generally not a function of $R_o$. Whether it is or not makes no difference. There are four degrees of freedom for accurate (but not necessarily perfect) curve fitting $$[(C/-At + B)][(R_a/R_o)] - [(R_b/R_o)]$$

to $f(t)$ and/or vice versa. As is well known, according to the laws of measurement, no structure can be manufactured with perfect accuracy. The degrees of freedom are $R_o$, $R_a$, $R_b$ and C. The factor C may or may not be unity in some cases. When resistor 21 is a wire wound resistor and the wire thereof has a length L and a diameter D uniform along its length, $R_o$ may be varied by varying L and/or D. This is true because of the well known relationship $$R_o = 4 \rho_o L_o / \pi D_o^2$$

where, $$\pi = 3.1416,$$

$\rho_o$ is the resistivity of the material of which resistor 21 is made, $L_o$ is the length of the wire of which resistor 21 is made, and $D_o$ is the diameter of the wire of which resistor 21 is made.

The factors $L_o$ and/or $D_o$ may, thus, be varied to vary $R_o$.

The factors $\rho_o$, $L_o$ and $D_o$ are all factors which exist at $t = t_o$.

Temperature $t_o$ may or may not be about 273°.

The curve $f(t)$ is generally not a function of $L_o$ or $D_o$. However, whether it is or not makes no difference.

Irregular shapes of resistor 21 may or may not be used in the curve fitting, if desired. If so, several different ones with the same or different shapes and sizes may be employed to obtain the best curve fit. However, if resistor 21 is a wire of uniform diameter, that shape is entirely adequate.

What is claimed is:

1. Electro-optical apparatus comprising: a photometric analyzer having a probe mountable in a position such that an inner end thereof can extend inside at least partial enclosure means containing one or more materials, said probe inner end being positionable spaced inwardly in from the internal surface of the enclosure means wall, said photometric analyzer having an output end and being constructed to produce an output signal $S_o$ thereon, where $S_o = e_o e_t$, $e_o$ being a signal directly proportional to a parameter of one of said materials, $e_t$ being a dimensionless function of the temperature $t$ in degrees Kelvin of said one material; variable gain means having an input lead connected from said photometric analyzer output lead, and an output lead; and a first temperature sensor adapted to be mounted in proximity to said one material, said first temperature sensor being connected to said variable gain means in a manner to cause said variable gain means to produce an output signal on said output lead thereof which is directly proportional to the product of the photometric analyzer output signal $S_o$ and the reciprocal of $e_t$.

2. The invention as defined in claim 1, including utilization means having an input lead connected from said variable gain means output lead.

3. The invention as defined in claim 2, wherein said variable gain means output signal is a voltage, said utilization means including a voltmeter calibrated in volume per unit volume, each of said materials being a gas.

4. The invention as defined in claim 3, wherein $e_t$ is defined by $$e_t = -At + B$$

where,
A is a positive constant per degree Kelvin but otherwise dimensionless, and
B is a positive dimensionless constant.

5. The invention as defined in claim 4, wherein said variable gain means includes an input junction, an amplifier having an inverting input lead connected from said input junction, and an output lead, first means providing resistance connected from said variable gain means input lead to said input junction, said first temperature sensor including a temperature sensitive first resistor having first and second leads, second means connecting said input junction to said first lead of said first resistor, first branch means for connecting said second lead of said first resistor to said amplifier output lead, and means connecting said amplifier output lead to said variable gain means output lead.

6. The invention as defined in claim 5, wherein said amplifier is a differential amplifier, said amplifier having a non-inverting input lead, and source means connected from said amplifier non-inverting input lead to maintain the same at a constant D.C. potential, said source means being adjustable to change the amplitude of said D.C. potential.

7. The invention as defined in claim 6, wherein a second temperature sensor is also provided which is adapted to be mounted in proximity to said one material, said first branch means including a single-pole, double-throw switch having a pole and first and second contacts, means connecting said second lead of said first resistor to said first contact, means connecting said pole to said amplifier output lead, means providing temperature insensitive resistance connected from said input junction to said second contact, and means connected from said second temperature sensor for moving said pole into engagement with said second contact when the temperature of said second temperature sensor is below a predetermined temperature and for moving said pole into engagement with said first contact when the temperature of said second temperature sensor is above said predetermined temperature.

8. The invention as defined in claim 7, wherein said predetermined temperature is about 345°.

9. The invention as defined in claim 8, wherein said first resistor has a first resistance which is a function of temperature in degrees Kelvin, said first resistance being approximately equal to $R(t)$ where, $R(t) = R_o f(t)$, and
$R_o$ is the resistance of said first resistor at a temperature $t = t_o$, said first means having an equivalent series resistance equal to $R_a$, the sum of the equivalent series resistances of said first branch means and said second means being equal to $R_b$, said first resistor, said first branch means, and said first and second means being constructed in a manner such that $$f(t) = [(C/-At + B)][(R_a/R_o)] - [(R_b/R_o)]$$

where C is an arbitrary positive dimensionless constant larger than zero.

10. The invention as defined in claim 9, wherein said first resistor is made of nickel.

11. The invention as defined in claim 1, wherein $e_t$ is defined by $$e_t = -At + B$$

where,
A is a positive constant per degree Kelvin but otherwise dimensionless, and
B is a positive dimensionless constant.

12. The invention as defined in claim 2, wherein $e_t$ is defined by $$e_t = -At + B$$

where,
A is a positive constant per degree Kelvin but otherwise dimensionless, and
B is a positive dimensionless constant.

13. The invention as defined in claim 2, wherein said variable gain means includes an input junction, an amplifier having an inverting input lead connected from said input junction, and an output lead, first means providing resistance connected from said variable gain means input lead to said input junction, said first temperature sensor including a temperature sensitive first resistor having first and second leads, second means connecting said input junction to said first lead of said first resistor, first branch means for connecting said second lead of said first resistor to said amplifier output lead, and means connecting said amplifier output lead to said variable gain means output lead.

14. The invention as defined in claim 13, wherein a second temperature sensor is also provided which is adapted to be mounted in proximity to said one material, said first branch means including a single-pole, double-throw switch having a pole and first and second contacts, means connecting said second lead of said first resistor to said first contact, means connecting said pole to said amplifier output lead, means providing temperature insensitive resistance connected from said input junction to said second contact, and means connected from said second temperature sensor for moving said pole into engagement with said second contact when the temperature of said second temperature sensor is below a predetermined temperature and for moving said pole into engagement with said first contact when the temperature of said second temperature sensor is above said predetermined temperature.

15. The invention as defined in claim 14, wherein said first resistor is made of nickel.

16. The invention as defined in claim 14, wherein said first resistor has a first resistance which is a function of temperature in degrees Kelvin, said first resistance being approximately equal to $R(t)$ where, $$R(t) = R_o f(t), \text{ and}$$

$R_o$ is the resistance of said first resistor at a temperature $t = t_o$, said first means having an equivalent series resistance equal to $R_a$, the sum of the equivalent series resistances of said first branch means and said second means being equal to $R_b$, said first resistor, said first branch means, and said first and second means being constructed in a manner such that $$f(t) = [(C/-At + B)][(R_a/R_o)] - [(R_b/R_o)]$$

where C is an arbitrary positive dimensionless constant larger than zero, $e_t$ being defined by $$e_t = -At + B$$

where,

A is a positive constant per degree Kelvin but otherwise dimensionless, and

B is a positive dimensionless constant.

17. The invention as defined in claim 16, wherein said first resistor is made of nickel.

18. The invention as defined in claim 13, wherein said first resistor is made of nickel.

19. The invention as defined in claim 13, wherein said first resistor has a first resistance which is a function of temperature in degrees Kelvin, said first resistance being approximately equal to R(t) where, $$R(t) = R_0 f(t), \text{ and}$$

$R_o$ is the resistance of said first resistor at a temperature $t = t_o$, said first means having an equivalent series resistance equal to $R_a$, the sum of the equivalent series resistances of said first branch means and said second means being equal to $R_b$, said first resistor, said first branch means, and said first and second means being constructed in a manner such that $$f(t) = [(C/-At + B)][(R_a/R_o)] - [(R_b/R_o)]$$

where C is an arbitrary positive dimensionless constant larger than zero, $e_t$ being defined by $$e_t = -At + B$$

where,

A is a positive constant per degree Kelvin but otherwise dimensionless, and

B is a positive dimensionless constant.

20. The invention as defined in claim 19, wherein said first resistor is made of nickel.

21. The invention as defined in claim 1, wherein said variable gain means includes an input junction, an amplifier having an inverting input lead connected from said input junction, and an output lead, first means providing resistance connected from said variable gain means input lead to said input junction, said first temperature sensor including a temperature sensitive first resistor having first and second leads, second means connecting said input junction to said first lead of said first resistor, first branch means for connecting said second lead of said first resistor to said amplifier output lead, and means connecting said amplifier output lead to said variable gain means output lead.

22. The invention as defined in claim 21, wherein a second temperature sensor is also provided which is adapted to be mounted in proximity to said one material, said first branch means including a single-pole, double-throw switch having a pole and first and second contacts, means connecting said second lead of said first resistor to said first contact, means connecting said pole to said amplifier output lead, means providing temperature insensitive resistance connected from said input junction to said second contact, and means connected from said second temperature sensor for moving said pole into engagement with said second contact when the temperature of said second temperature sensor is below a predetermined temperature and for moving said pole into engagement with said first contact when the temperature of said second temperature sensor is above said predetermined temperature.

23. The invention as defined in claim 22, wherein said first resistor is made of nickel.

24. The invention as defined in claim 22, wherein said first resistor has a first resistance which is a function of temperature in degrees Kelvin, said first resistance being approximately equal to R(t) where, $$R(t) = R_0 f(t),$$

and $R_o$ is the resistance of said first resistor at a temperature $t = t_o$, said first means having an equivalent series resistance equal to $R_a$, the sum of the equivalent series resistances of said first branch means and said second means being equal to $R_b$, said first resistor, said first branch means, and said first and second means being constructed in a manner such that $$f(t) = [(C/-At + B)][(R_a/R_o)] - [(R_b/R_o)]$$

where C is an arbitrary positive dimensionless constant larger than zero, $e_t$ being defined by $$e_t = -At + B$$

where,

A is a positive constant per degree Kelvin but otherwise dimensionless, and

B is a positive dimensionless constant.

25. The invention as defined in claim 24, wherein said first resistor is made of nickel.

26. The invention as defined in claim 21, wherein said first resistor is made of nickel.

27. The invention as defined in claim 21, wherein said first resistor has a first resistance which is a function of temperature in degrees Kelvin, said first resistance being approximately equal to R(t) where, $$R(t) = R_0 f(t),$$

and $R_o$ is the resistance of said first resistor at a temperature $t = t_o$, said first means having an equivalent series resistance equal to $R_a$, the sum of the equivalent series resistances of said first branch means and said second means being equal to $R_b$, said first resistor, said first branch means, and said first and second means being constructed in a manner such that $$f(t) = [(C/-At + B)][(R_a/R_o)] - [(R_b/R_o)]$$

where C is an arbitrary positive dimensionless constant larger than zero, $e_t$ being defined by $$e_t = -At + B$$

where,

A is a positive constant per degree Kelvin but otherwise dimensionless, and

B is a positive dimensionless constant.

28. The invention as defined in claim 27, wherein said first resistor is made of nickel.

* * * * *